H. L. CHARLES.
SMELTING OF ORES.
APPLICATION FILED JAN. 23, 1920.

1,394,472. Patented Oct. 18, 1921.

INVENTOR
Henry L. Charles
BY
ATTORNEY

UNITED STATES PATENT OFFICE.

HENRY L. CHARLES, OF NEW YORK, N. Y.

SMELTING OF ORES.

1,394,472. Specification of Letters Patent. Patented Oct. 18, 1921.

Application filed January 23, 1920. Serial No. 353,394.

*To all whom it may concern:*

Be it known that I, HENRY L. CHARLES, a citizen of the United States, residing at New York city, in the county of New York and State of New York, have invented certain new and useful Improvements in Smelting of Ores, of which the following is a specification, reference being had therein to the accompanying drawing.

My invention relates to improvements in reverberatory smelting furnaces and has particular reference to a method and means for changing the relative specific gravities of the slag and metal after it has passed through the furnace proper so as to separate the same and recover metal otherwise left in the discarded slag.

Figure 1:
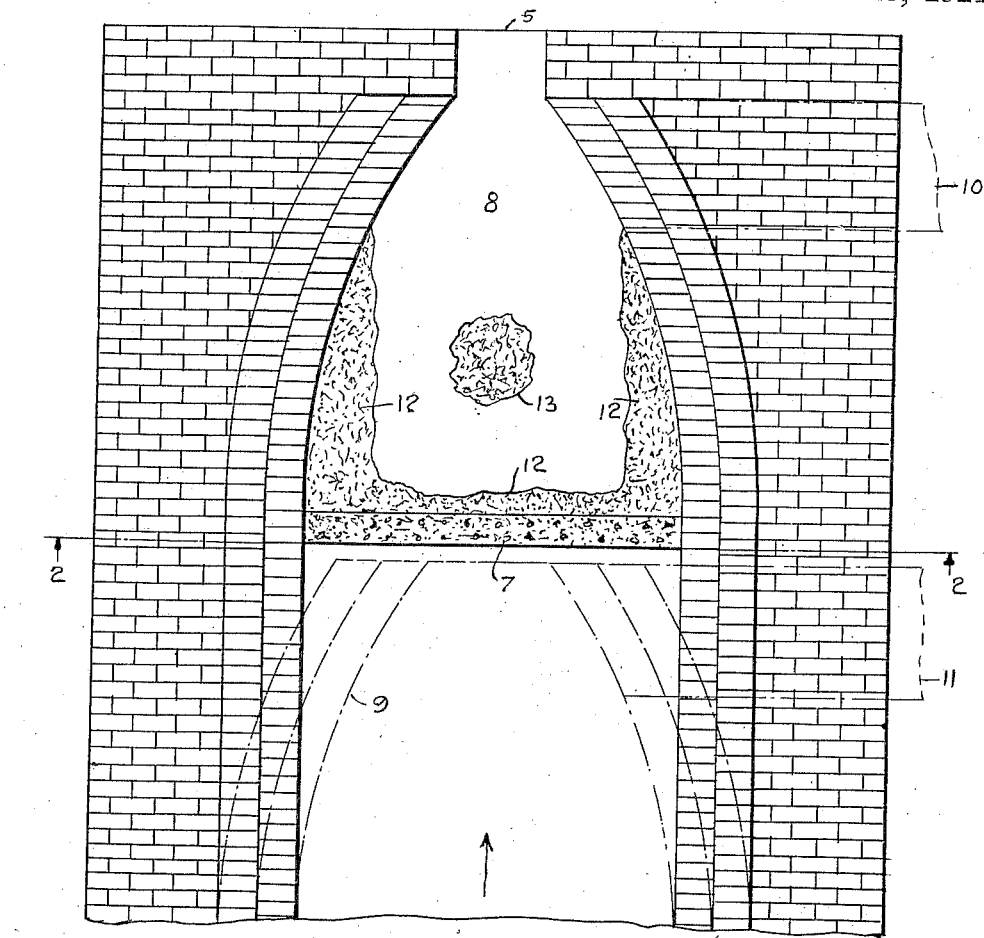
Figure 2:
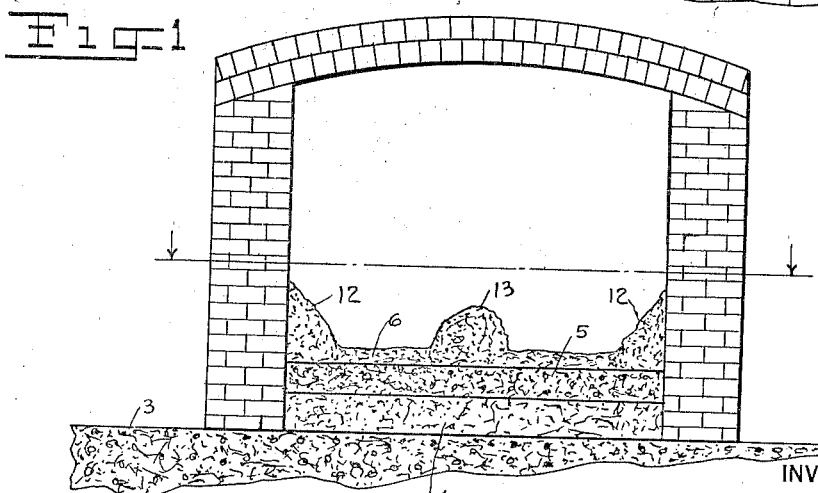

In the accompanying drawings I have illustrated in Figure 1 in plan view, parts being broken away, part of a reverberatory smelting furnace embodying an application of my invention. Fig. 2 is a cross-sectional view of the same on the line 2—2 of Fig. 1 on a reduced scale.

3 indicates the ground upon which the furnace is built, 4 the silica bottom of the hearth, 5 the matte or metal, and 6 the slag. 7 indicates a suitable wall or dam at the end of the furnace over which the slag traverses into the extension chamber 8.

The normal furnace is shown in dotted outline at 9 but in the preferred embodiment of my invention, the furnace is extended to provide for a chamber such as 8 to allow the slag passing over the dam 7 to pass through said chamber 8 being provided with the flue 10 quite the same as the normal flue indicated in dotted outline at 11 would be. 12—13 indicate piles of lime preferably in large lumps adapted to act upon the slag as it passes through the chamber 8, and the discharge 5 is kept slightly below the level of the dam 7, thus providing a continuous flow of material. The particular manner in which the lime rock is charged into the chamber 8, the method of its distribution or the piling of the same, may be more or less optional, although I prefer to bank it around the sides with some more or less centrally located, substantially as shown, and I prefer to use lumps of lime rock of about the size of a hen's egg up to the size of a man's body, rather than finely divided lime, and no appreciable amount of matte should be allowed to accumulate upon the hearth 8. The dam 7 may be kept to its maximum height by feeding highly silicious material upon it, or the dam may be built of any suitable refractory material such as silica, magnesite, or chromite brick, or any of such materials in a crude state. As the slag feeds forwardly in the direction of the arrow, shown in Fig. 1, it will flow over the top of the dam 7 by gravity to the hearth 8 and there come in contact with the lime rock embankments where violent boiling takes place due to the re-action of the calcium oxid attacking the silicates of the slag. This lightens the slag causing the remaining metal therein to sink to the bottom, thus varying the specific gravity or causing the same to separate sufficiently to allow the slag to travel along the hearth 8 to the outlet 5 leaving the metal available to be withdrawn in the usual manner. This method of extending the furnace hearth or providing an auxiliary section for thus separating any remaining metal in the slag will insure a more complete recovery of metal, the hot gases from the normal furnace being sufficient for the purpose, and the method does not incur any additional expense beyond the additional lime used and slight modification of structure.

Of course it will be understood that various modifications may be made in the construction and arrangement of parts without departing from the spirit of the invention as claimed.

I claim:

The method of smelting ores consisting in applying means after the ore is smelted for changing the relative specific gravities of the slag and metal for separating the same.

In testimony whereof I hereunto affix my signature.

HENRY L. CHARLES.